United States Patent
Kim (10) Patent No.: US 11,892,043 B2
(45) Date of Patent: Feb. 6, 2024

(54) BOOT FOR CALIPER BRAKE AND CALIPER BRAKE INCLUDING THE SAME

(71) Applicant: HL MANDO CORPORATION, Gyeonggi-do (KR)

(72) Inventor: Kihoon Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/372,377

(22) Filed: Jul. 9, 2021

(65) Prior Publication Data

US 2022/0018406 A1      Jan. 20, 2022

(30) Foreign Application Priority Data

Jul. 15, 2020   (KR) .................. 10-2020-0087237

(51) Int. Cl.
  *F16D 65/00*   (2006.01)
  *F16D 55/2265*   (2006.01)

(52) U.S. Cl.
  CPC ..... *F16D 55/2265* (2013.01); *F16D 65/0087* (2013.01)

(58) Field of Classification Search
  CPC .................. F16D 55/2265; F16D 65/0087
  See application file for complete search history.

(56) References Cited

U.S. PATENT DOCUMENTS

| | | | | |
|---|---|---|---|---|
| 4,265,340 | A * | 5/1981 | Scott | F16D 55/227 188/73.44 |
| 5,730,258 | A * | 3/1998 | Evans | F16D 55/22655 188/73.44 |
| 5,927,446 | A * | 7/1999 | Evans | F16D 55/227 188/73.44 |
| 6,039,156 | A * | 3/2000 | Schneider | F16D 55/22655 188/73.44 |
| 7,337,881 | B1 * | 3/2008 | Sherman, II | F16D 55/22655 188/72.4 |
| 8,857,576 | B2 * | 10/2014 | Kobayashi | F16D 55/2265 188/73.44 |
| 10,030,778 | B2 * | 7/2018 | Hermanski | F16J 15/52 |
| 2004/0188191 | A1 * | 9/2004 | Lintner | F16J 3/048 188/73.45 |
| 2008/0070706 | A1 * | 3/2008 | Compau | F16D 3/845 464/145 |

(Continued)

FOREIGN PATENT DOCUMENTS

CN    112303153 A  *  2/2021
KR    10-2010-0007501     1/2010

(Continued)

*Primary Examiner* — Thomas W Irvin
(74) *Attorney, Agent, or Firm* — Ladas & Parry, LLP (57) ABSTRACT

Disclosed are a boot for a caliper brake and the caliper brake including the same. The boot, which is provided to be installed on a guide rod to allow a caliper housing to be slidably coupled to a carrier during braking, includes a first coupling part coupled to the guide rod at one end thereof, and a second coupling part coupled to the carrier at the other end thereof, wherein the second coupling part is provided with an elastic protrusion provided to be in contact with an outer surface of the guide rod so that a reaction force is generated by the guide rod moving together with the caliper housing during braking.

19 Claims, 6 Drawing Sheets

(56) References Cited

U.S. PATENT DOCUMENTS

2009/0260928 A1* 10/2009 Baumgartner .... F16D 55/22655
                                                  188/73.44
2012/0234635 A1*  9/2012 Wake .................. F16D 55/2265
                                                  188/73.45
2013/0161134 A1   6/2013 Kobayashi et al.

FOREIGN PATENT DOCUMENTS

KR        101526257 B1 * 12/2013   ....... F16D 55/22655
WO    WO-2016181896 A1 * 11/2016   ......... F16D 55/2265

* cited by examiner

BOOT FOR CALIPER BRAKE AND CALIPER BRAKE INCLUDING THE SAME

CROSS-REFERENCE TO RELATED APPLICATION(S)

This application is based on and claims priority under 35 U.S.C. § 119 to Korean Patent Application No. 10-2020-0087237, filed on Jul. 15, 2020, in the Korean Intellectual Property Office, the disclosure of which is incorporated by reference herein in its entirety.

BACKGROUND

1. Field

The disclosure relates to a boot for a caliper brake and the caliper brake including the same, and more particularly, to a caliper brake including a boot for rolling-back a caliper housing when braking is released.

2. Description of the Related Art

In general, a caliper brake includes a carrier on which a pair of pad plates are mounted to advance and retreat to press a disk rotating together with a wheel of a vehicle, a caliper housing provided with a cylinder slidably mounted on the carrier through a guide rod and in which a piston is installed to advance and retreat by a braking hydraulic pressure, and the like.

The caliper brake performs braking as the piston presses the inner pad plate by the hydraulic pressure during braking and the caliper housing slides from the carrier by a reaction force against the pressing to press the outer pad plate toward the disk. The caliper brake may further include an electrically operated actuator and perform parking braking as a spindle unit, which receives a rotational force from a motor of the actuator and converts a rotational motion into a linear motion, presses the piston. In this case, in order to reduce a drag phenomenon in which friction between the disk and the friction pads attached to the pair of pad plates continues to occur after braking, the caliper brake may retreat the piston using a seal member accommodated in a seal groove formed on the cylinder and a roll-back chamber in the seal groove.

The seal member is formed in a ring shape to be inserted into the annular seal groove formed on an inner surface of the cylinder of the caliper housing and disposed between the inner surface of the cylinder and an outer surface of the piston. The seal member performs a function of preventing leakage of a braking fluid by sealing between the inner surface of the cylinder and the outer surface of the piston and a function of returning the piston to its original position. That is, the seal member functions to return the piston, which has advanced, by an elastic force of the seal member to its original position after the braking is finished. This function is called a roll-back.

In such a conventional caliper brake, a drag phenomenon occurs in which in high pressure braking, the piston continues to slidingly advance while the elastic deformation of the seal member is completed, so that the piston does not return smoothly to its original position when braking is released, thereby causing friction between the disk and the friction pad. In addition, in the case of increasing an elastic deformable range of the seal member by expanding an inclination surface of the seal groove in a piston advance direction in order to solve this drag phenomenon, a required amount of braking fluid increases, which may increase an invalid stroke and deteriorate pedal feel when a brake pedal is operated.

In order to solve the above problems, a retraction spring is installed and used on the pair of pad plates. The retraction spring is installed at an upper end of the pair of pad plates to provide an elastic force to the pad plates. The retraction spring is disposed between the upper end of the pair of pad plates and the caliper housing.

However, as the retraction spring is installed at the upper end of the pad plates, there is a problem in that the processing and manufacturing costs of the retraction spring increases, as well as being difficult for the retraction spring to be installed.

In addition, there is a problem in that a clearance may not be secured between the friction pad and the disk because when the pair of pad plates are returned to their original positions through the elastic restoring force of the retraction spring, the load required to slide the caliper housing from the carrier through the outer pad plate in contact with the caliper housing is small.

SUMMARY

It is an aspect of the disclosure to provide a boot for a caliper brake capable of preventing a drag phenomenon by generating a reaction force of the boot during braking to roll-back a capper housing, and the caliper brake including the same.

It is an aspect of the disclosure to provide a boot for a capper brake having an improved structure compared to a conventional boot commonly used, and the caliper brake including the same.

Additional aspects of the disclosure will be set forth in part in the description which follows and, in part, will be obvious from the description, or may be learned by practice of the disclosure.

In accordance with an aspect of the disclosure, a boot, which is provided to be installed on a guide rod to allow a caliper housing to be slidably coupled to a carrier during braking, includes a first coupling part coupled to the guide rod at one end thereof, and a second coupling part coupled to the carrier at the other end thereof, wherein the second coupling part is provided with an elastic protrusion provided to be in contact with an outer surface of the guide rod so that a reaction force is generated by the guide rod moving together with the caliper housing during braking.

In accordance with an aspect of the disclosure, a caliper brake includes a carrier fixed to a vehicle body, a caliper housing installed on the carrier to advance and retreat, a guide rod having one end fixed to the caliper housing and the other end slidably coupled to a guide hole provided on the carrier to slidably couple the caliper housing to the carrier, and a boot mounted on the guide rod and the carrier to prevent foreign substances from being introduced into the guide hole, wherein the boot includes a first coupling part coupled to the guide rod at one end thereof, and a second coupling part coupled to the carrier at the other end thereof, and wherein the second coupling part is provided with an elastic protrusion provided to be in contact with an outer surface of the guide rod so that a reaction force is generated by the guide rod moving together with the caliper housing during braking.

The boot may further include a corrugate part provided to connect the first coupling part and the second coupling part and to extend or contract when the guide rod moves.

The elastic protrusion may be formed to protrude obliquely in a moving direction of the guide rod moving during braking.

The second coupling part may be formed in a ring shape, and the elastic protrusion may be integrally formed to protrude from an inner circumferential surface of the second coupling part.

A plurality of the elastic protrusions may be provided to be spaced apart from each other at predetermined intervals along the inner circumferential surface of the second coupling part.

A plurality of the elastic protrusions may be formed in a moving direction of the guide rod.

A fastening groove to which the second coupling part is coupled may be provided in the guide hole, and a protrusion protruding toward the fastening groove to be seated on and coupled to the fastening groove may be provided at a coupling end of the second coupling part coupled to the fastening groove.

The guide rod may be provided with a locking groove provided such that the first coupling part is fitted and fixed thereto.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
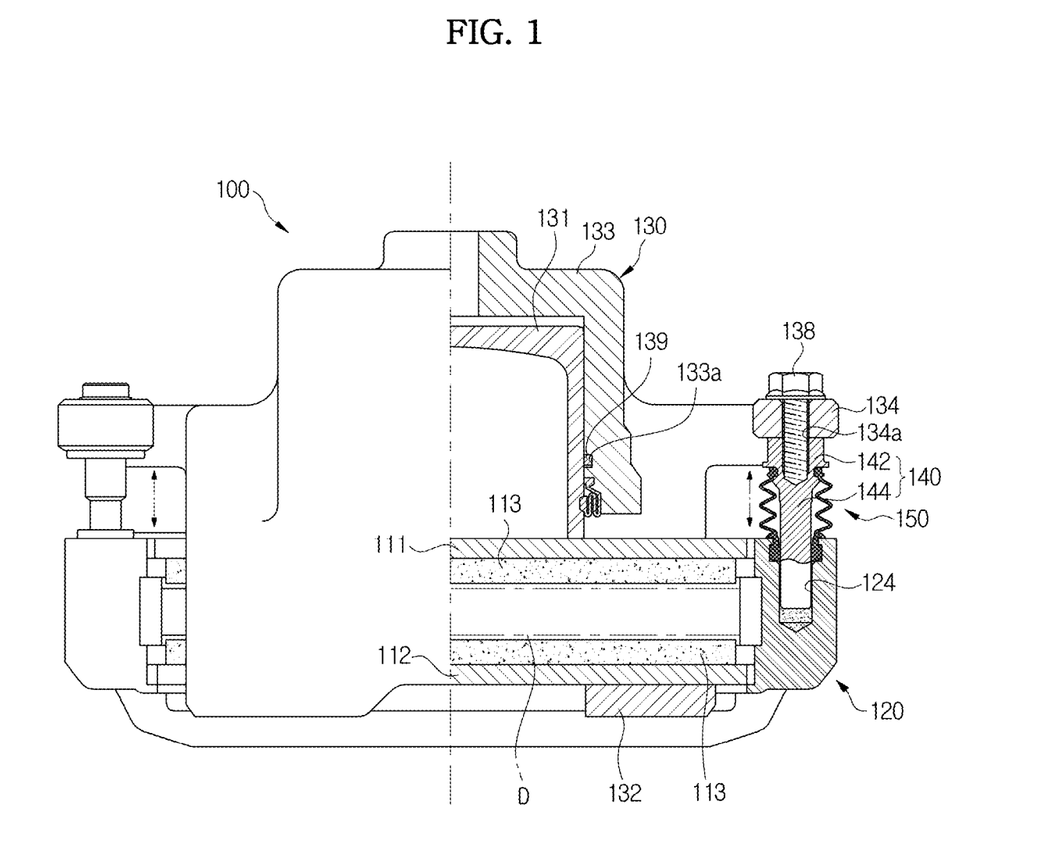
FIG. 1 is a cross-sectional view of a caliper brake according to an embodiment of the disclosure.
Figure 2:
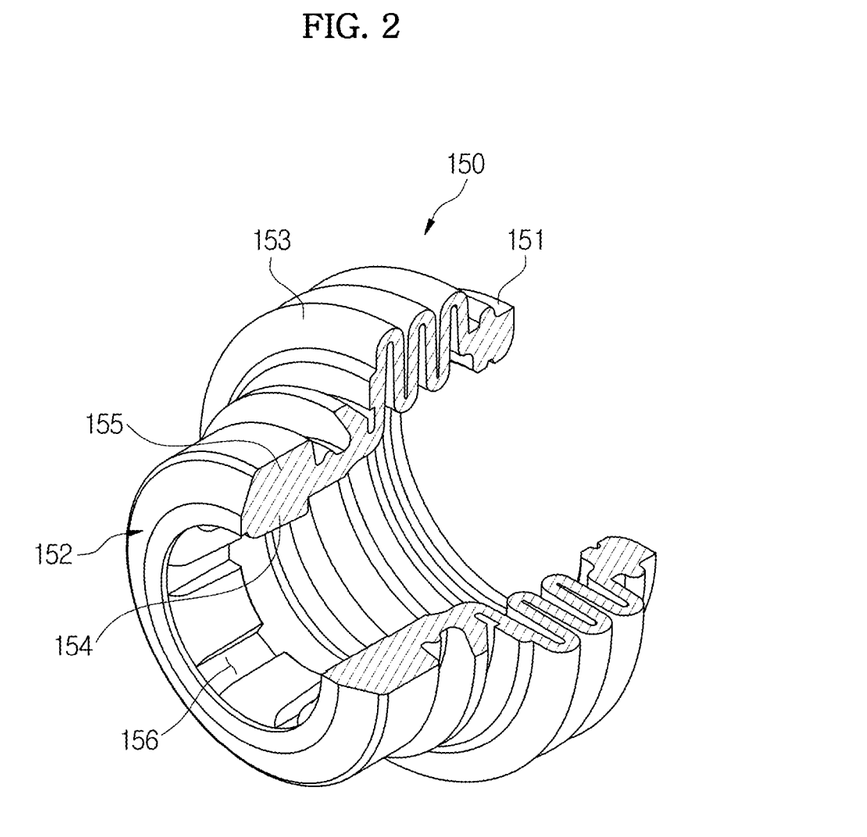
FIG. 2 is a partially cut-away perspective view of a boot provided in the caliper brake according to an embodiment of the disclosure.
Figure 3:
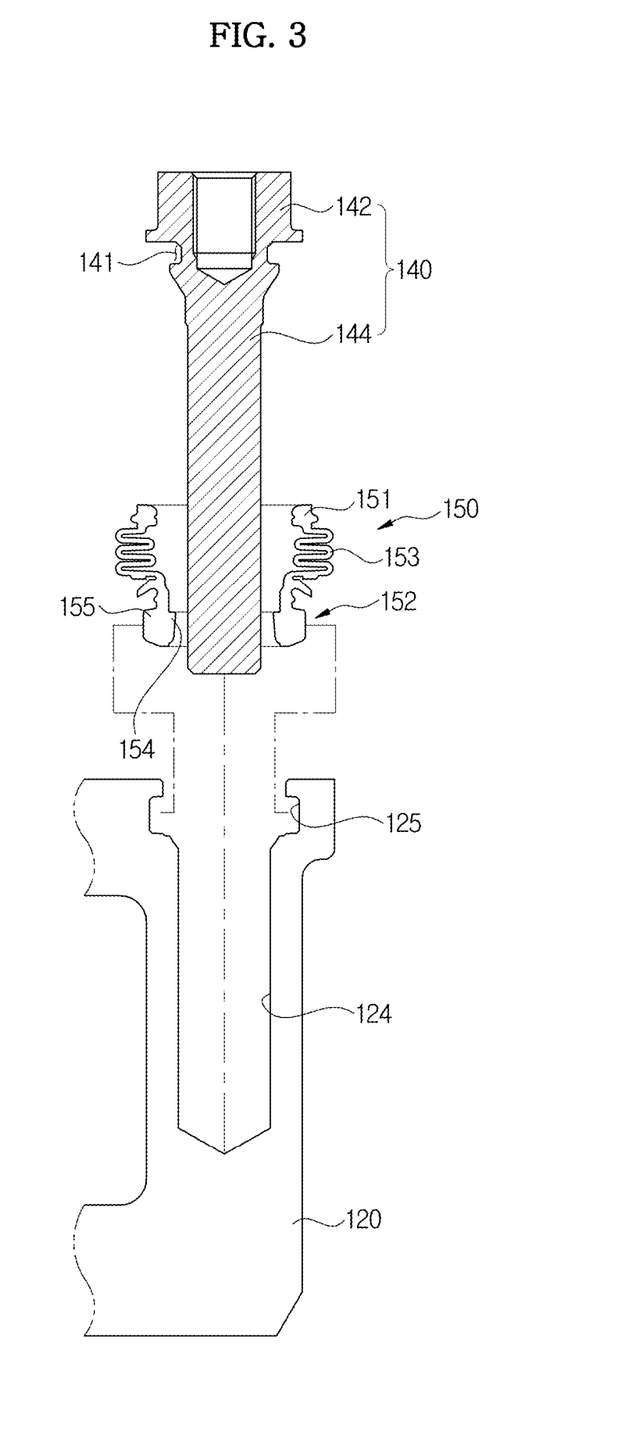
FIG. 3 is an exploded cross-sectional view illustrating a state in which the boot is coupled to a guide hole and a guide rod in the caliper brake according to an embodiment of the disclosure.
Figure 4:
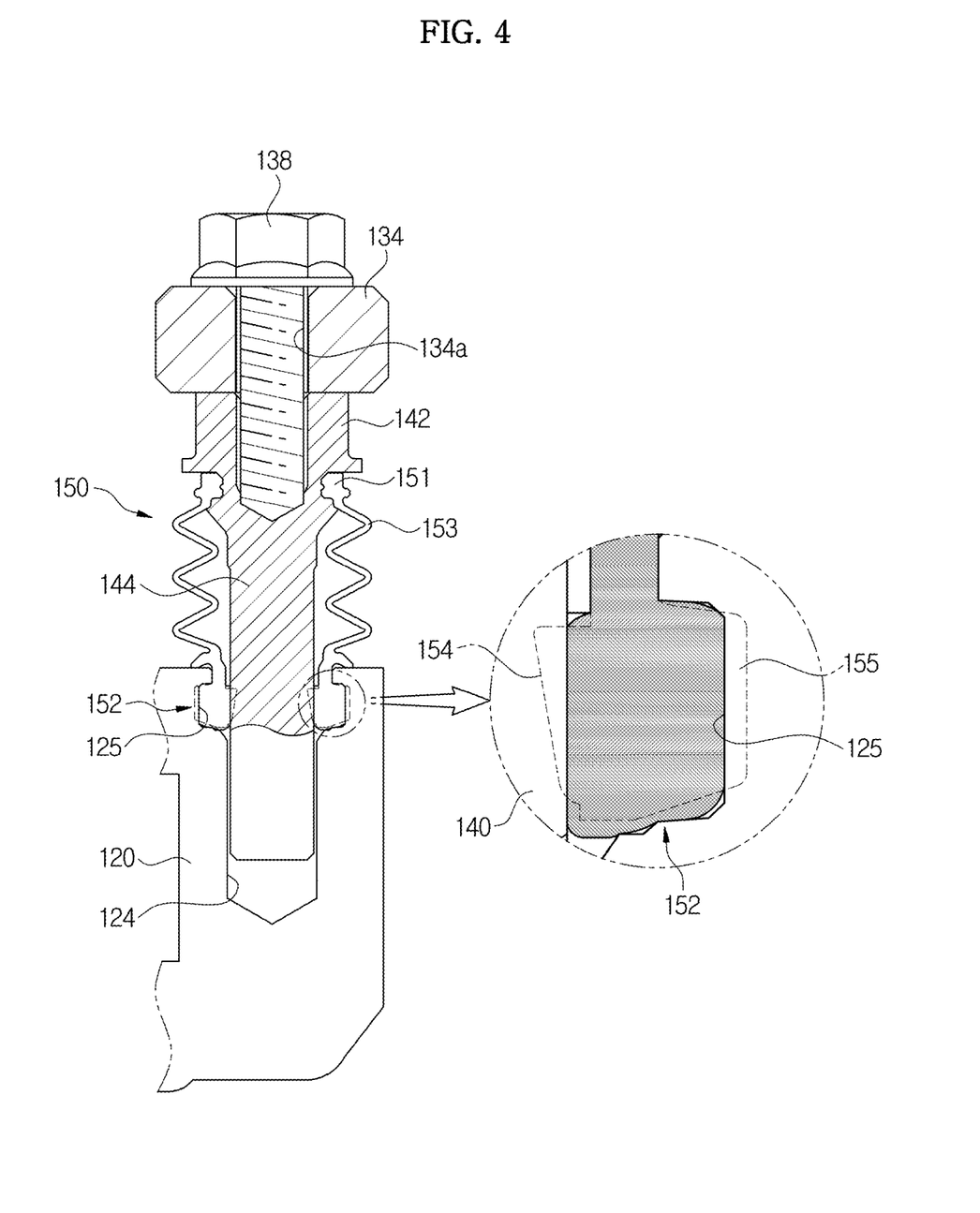
FIG. 4 is a cross-sectional view illustrating a state in which the boot in FIG. 3 is coupled.

FIG. 1 is a cross-sectional view of a caliper brake according to an embodiment of the disclosure, FIG. 2 is a partially cut-away perspective view of a boot provided in the caliper brake according to an embodiment of the disclosure, FIG. 3 is an exploded cross-sectional view illustrating a state in which the boot is coupled to a guide hole and a guide rod in the caliper brake according to an embodiment of the disclosure, and FIG. 4 is a cross-sectional view illustrating a state in which the boot in FIG. 3 is coupled.

Referring to FIGS. 1 to 4, a caliper brake 100 according to an embodiment of the disclosure includes a pair of pad plates 111 and 112 to which friction pads 113 are attached to press opposite sides of a disk D rotating together with a wheel (not shown), respectively, a carrier 120 on which the pair of pad plates 111 and 112 are installed to be spaced apart from each other by a predetermined distance and to be movable toward the disk D, a caliper housing 130 slidably installed on the carrier 120 such that the pair of pad plates 111 and 112 may press the disk D, a guide rod 140 having one end fixed to the caliper housing 130 and the other end slidably coupled to a guide hole 124 provided on the carrier 120 to slidably couple the caliper housing 130 to the carrier 120, and a boot 150 mounted on the guide rod 140 and the carrier 120 to prevent foreign substances from being introduced into the guide hole 124.

The friction pad 113 is attached to an inner surface of each of the pair of pad plates 111 and 112. The pair of pad plates 111 and 112 include the inner pad plate 111 disposed in contact with a piston 131 and the outer pad plate 112 disposed in contact with a finger part 132 of the caliper housing 130, which will be described later, and are slidably installed on the carrier 120. That is, the pair of pad plates 111 and 112 are installed on the carrier 120 fixed to a vehicle body to advance toward and retreat from the opposite sides of the disk D, thereby performing a braking operation.

The carrier 120 is fixedly coupled to a knuckle (not shown) of the vehicle body to be positioned on one side of an outer circumference of the disk D. The guide holes 124 are formed in upper opposite sides of the carrier 120. A fastening groove 125 is provided at an open inlet portion of the guide hole 124 such that the boot 150, which will be described later, is coupled thereto.

The caliper housing 130 is slidably installed on the carder 120 as the guide rods 140 respectively installed at opposite ends of the caliper housing 130 are inserted into the guide holes 124 provided at opposite ends of the carrier 120. For coupling the guide rod 140, mounting parts 134 having coupling holes 134a formed at positions corresponding to the guide holes 124 are provided at the opposite ends of the caliper housing 130. Accordingly, one end of the guide rod 140 is coupled to the mounting part 134, and the other end of the guide rod 140 is inserted into the guide hole 124.

The guide rod 140 includes a cylindrical guide shaft portion 144 and a head portion 142 provided in the form of an enlarged diameter at one end of the guide shaft portion 144.

A thread groove is formed on an inner circumferential surface of the head portion 142 so that a fixing bolt 138 may be coupled, and a locking groove 141 recessed to a predetermined depth is formed on an outer circumferential surface of the head portion 142.

As the guide shaft portion 144 is slidably inserted and coupled to the guide hole 124 of the carder 120, and the fixing bolt 138 passes through the coupling hole 134a of the caliper housing 130 and is screwed into the thread groove of the head portion 142, the guide rod 140 is firmly and fixedly coupled to the capper housing 130 so that the carrier 120 and the caliper housing 130 are mutually movable.

The caliper housing 130 includes a cylinder 133 in which a piston 131 for pressing the inner pad plate 111 is installed to advance and retreat, and the finger part 132 for pressing the outer pad plate 112.

The piston 131 is installed in the cylinder 133 to advance and retreat. The piston 131 presses the inner pad plate 111 while advancing when braking hydraulic pressure is applied to the cylinder 133, the caliper housing 130 slides from the carrier 120 together with the guide rods 140 by a reaction force, and the finger part 132 presses the outer pad plate 112 toward the disk D. Accordingly, the pair of pad plates 111 and 112 press the disk 0, thereby generating a braking force.

Reference numeral '139' denotes a seal member which is provided between the cylinder 133 and the piston 131 and installed in the seal groove 133*a* formed on the cylinder 133. That is, the seal member 139 performs a function of preventing leakage of a braking fluid by sealing between an inner surface of the cylinder 133 and an outer surface of the piston 131 and a function of returning the piston 131 to its original position when braking is released.

The boot 150 is provided to surround the outside of the guide rod 140 in order to prevent the inflow of foreign substances into the guide hole 124. Specifically, the boot 150 includes a corrugate part 153 provided to extend and contract in a longitudinal direction, a first coupling part 151 extending from one end of the corrugate part 153 to be coupled to the guide rod 140, and a second coupling part 152 extending from the other end of the corrugate part 153 to be coupled to the carrier 120. The boot 150 may have a hollow center so as to surround the guide rod 140. Accordingly, the first coupling part 151 and the second coupling part 152 may be provided to have a ring shape.

The first coupling part 151 may be fixed by being press-fitted into the locking groove 141 formed on the head portion 142 of the guide rod 140.

The second coupling part 152 is provided to be in contact with an outer surface of the guide rod 140, that is, the guide shaft portion 144, and is coupled to the fastening groove 125 formed on the guide hole 124. As illustrated in FIG. 3, the second coupling part 152 may be provided with a protrusion 155 protruding toward the fastening groove 125 to be seated on and coupled to the fastening groove 125. In addition, the second coupling part 152 may be provided with an elastic protrusion 154 provided to be in contact with the outer surface of the guide rod 140, that is, the guide shaft portion 144 so that a reaction force is generated by the guide rod 140 moving together with the caliper housing 130 during braking.

The elastic protrusion 154 may be integrally formed to protrude from an inner circumferential surface of the second coupling part 152. The elastic protrusion 154 may be formed to protrude obliquely in a moving direction of the guide rod 140 moving during braking. That is, by the elastic protrusion 154, an inner diameter of the second coupling part 152 may be provided to gradually decrease in the moving direction of the guide rod 140 (from left to right based on FIG. 5) during braking.

Figure 5:
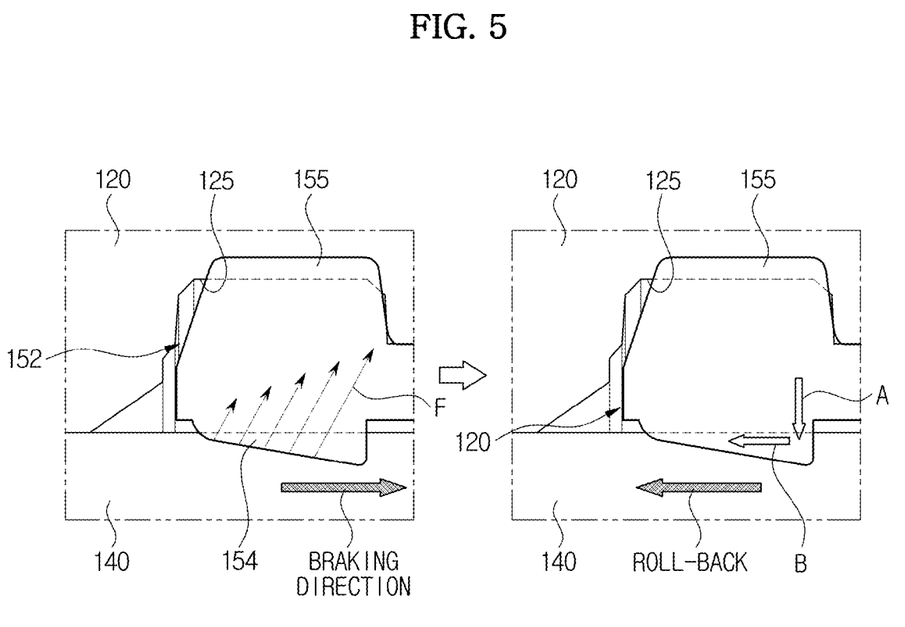
FIG. 5 is a view illustrating a roll-back state of a caliper housing according to a reaction force of the boot generated when the caliper brake according to an embodiment of the disclosure brakes.

Referring to FIG. 5, when the guide rod 140 moves together with the caliper housing 130 during braking, a load distribution occurs on the elastic protrusion 154 as indicated by arrows F. Accordingly, a load is applied to the guide rod 140 in the direction of an arrow B by the reaction force generated on the elastic protrusion 154 when braking is released. That is, because the elastic protrusion 154 generates a reaction force depending on the movement of the guide rod 140 only during braking, the elastic protrusion 154 applies a load to the guide rod 140 in the opposite direction (arrow B) to the braking direction by an elastic restoring force according to the reaction force after the braking is released, so that a roll-back function of returning the caliper housing 130 moving together with the guide rod 140 to its original position is performed.

The elastic protrusion 154 does not generate a reaction force in a on-operational state of the brake, and performs a sealing function.

Referring to FIG. 2, a plurality of the elastic protrusions 154 may be provided to be spaced apart from each other at predetermined intervals along the inner circumferential surface of the second coupling part 152. Accordingly, slots 156 may be formed in a longitudinal direction between the plurality of elastic protrusions 154 provided along the inner circumferential surface of the second coupling part 152. By the slot 156, a space in which the elastic protrusion 154 may be easily elastically deformed may be secured.

Figure 6:
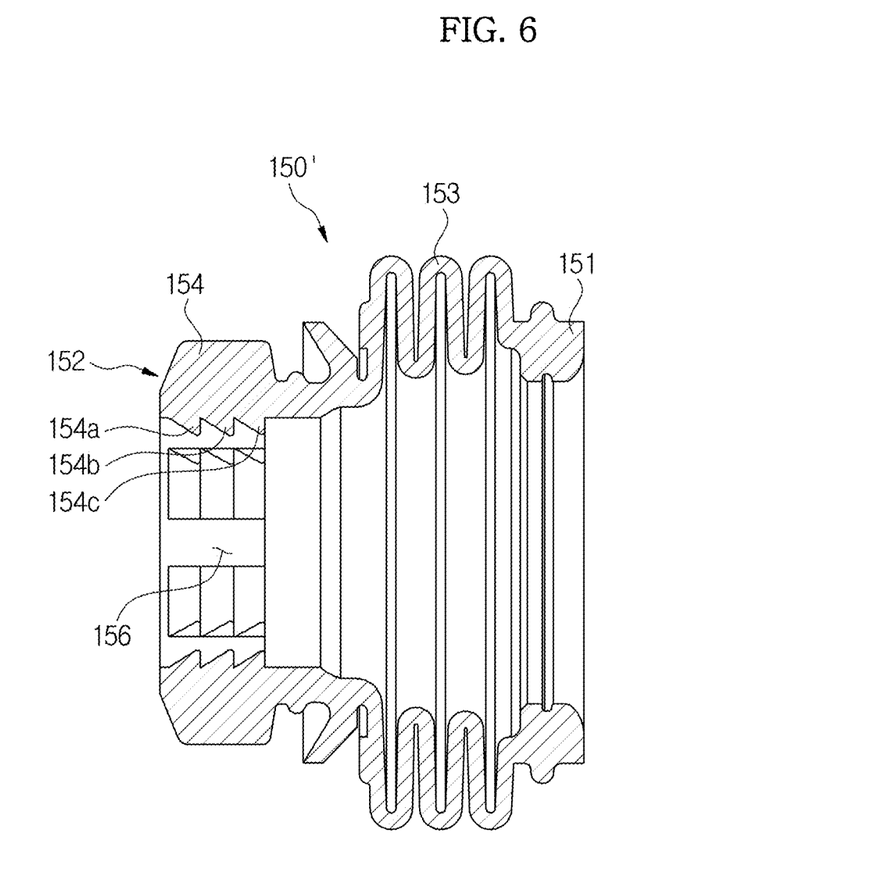
FIG. 6 is a cross-sectional view of a boot according to another embodiment of the disclosure.

In the above description, one of the elastic protrusion 154 is provided in the longitudinal direction of the guide rod 140 on the inner circumferential surface of the second coupling part 152 as an example, but is not limited thereto, and as illustrated in FIG. 6, a boot 150' may be provided in which a plurality of elastic protrusions 154*a*, 154*b*, and 154*c* is formed in the moving direction of the guide rod (refer to '140' in FIG. 5).

That is, the boot 150' according to the present embodiment may include the plurality of elastic protrusions 154*a*, 154*b*, and 154*c* in the longitudinal direction on the inner circumferential surface of the second coupling part 152. In this case, the same reference numerals as in the previous embodiment indicate members having the same function.

The plurality of elastic protrusions 154*a*, 154*b*, and 154*c* may each generate a reaction force during braking, and may perform a function of rolling-back the caliper housing 130 by a predetermined amount by an elastic restoring force according to the reaction force when the braking is released. In addition, each of the elastic protrusions 154*a*, 154*b*, and 154*c* performs a sealing function in the non-operational state of the brake. In the above description, three of the elastic protrusions 154*a*, 154*b*, and 154*c* are provided in the longitudinal direction as an example, but is not limited thereto, and the number may be selectively increased or decreased as long as the caliper housing 130 may be sufficiently rolled-back.

As is apparent from the above, a boot for a caliper brake according to an embodiment of the disclosure and a caliper brake including the same can prevent a drag phenomenon by generating a reaction force of the boot during braking to roll-back a caliper housing.

Further, the boot for a caliper brake according to an embodiment of the disclosure and the caliper brake including the same can reduce manufacturing costs because a retraction spring to be separately installed is unnecessary to secure a clearance between a disk and a friction pad of a pad plate as the drag phenomenon is prevented by a structure of the boot improved compared to a conventional boot commonly used.

While the disclosure has been particularly described with reference to exemplary embodiments, it should be understood by those of skilled in the art that various changes in form and details may be made without departing from the spirit and scope of the disclosure.

What is claimed is:

1. A boot comprising:
   a first coupling part coupled to a guide rod at one end of the boot for a caliper brake provided to be installed on the guide rod to allow a caliper housing to be slidably coupled to a carrier during braking; and
   a second coupling part coupled to the carrier at the other end of the boot,
   wherein the second coupling part is provided with one or more elastic protrusions provided to be in contact with an outer surface of the guide rod so that a reaction force is generated by the guide rod moving together with the caliper housing during braking,
wherein an inner diameter of the elastic protrusion of the second coupling part facing the guide rod is gradually decreased toward an outside of the guide hole, and
wherein a surface of the elastic protrusion of the second coupling part facing the guide rod is obliquely slanted in only one direction such that an elastic force of the elastic protrusion is generated in a direction oblique to a radial direction of the boot for the caliper brake.

2. The boot according to claim 1, further comprising a corrugate part provided to connect the first coupling part and the second coupling part and to extend or contract when the guide rod moves.

3. The boot according to claim 1, wherein the elastic protrusion is formed to protrude obliquely in a moving direction of the guide rod moving during braking.

4. The boot according to claim 1, wherein the second coupling part is formed in a ring shape, and the elastic protrusion is integrally formed to protrude from an inner circumferential surface of the second coupling part.

5. The boot according to claim 4, wherein a plurality of the elastic protrusions is provided to be spaced apart from each other at predetermined intervals along the inner circumferential surface of the second coupling part.

6. The boot according to claim 4, wherein a plurality of the elastic protrusions is formed in a moving direction of the guide rod.

7. The boot according to claim 1, wherein one end formed at an innermost part of the elastic protrusion of the second coupling part is a thickest part of the elastic protrusion of the second coupling part, and the another end formed at an outmost part of the elastic protrusion of the second coupling part is a thinnest part of the elastic protrusion of the second coupling part.

8. The boot according to claim 1, wherein the plurality of elastic protrusions of the second coupling part, each formed along a circumferential direction of the boot, are arranged one by one in an axial direction of the boot.

9. The boot according to claim 1, wherein the guide rod is coupled to the caliper housing and the carrier is coupled to a vehicle body.

10. A caliper brake comprising:
a carrier fixed to a vehicle body;
a caliper housing installed on the carrier to advance and retreat;
a guide rod having one end fixed to the caliper housing and the other end slidably coupled to a guide hole provided on the carrier to slidably couple the caliper housing to the carrier; and
a boot mounted on the guide rod and the carrier to prevent foreign substances from being introduced into the guide hole,
wherein the boot comprises a first coupling part coupled to the guide rod at one end of the boot, and a second coupling part coupled to the carrier at the other end of the boot,
wherein the second coupling part is provided with one or more elastic protrusions provided to be in contact with an outer surface of the guide rod so that a reaction force is generated by the guide rod moving together with the caliper housing during braking,
wherein an inner diameter of the elastic protrusion of the second coupling part facing the guide rod is gradually decreased toward an outside of the guide hole, and
wherein a surface of the elastic protrusion of the second coupling part facing the guide rod is obliquely slanted in only one direction such that an elastic force of the elastic protrusion is generated in a direction oblique to a radial direction of the boot.

11. The caliper brake according to claim 10, wherein the boot further comprises a corrugate part provided to connect the first coupling part and the second coupling part and to extend or contract when the guide rod moves.

12. The caliper brake according to claim 10, wherein the elastic protrusion is formed to protrude obliquely in a moving direction of the guide rod moving during braking.

13. The caliper brake according to claim 10, wherein the second coupling part is formed in a ring shape, and the elastic protrusion is integrally formed to protrude from an inner circumferential surface of the second coupling part.

14. The caliper brake according to claim 13, wherein a plurality of the elastic protrusions is provided to be spaced apart from each other at predetermined intervals along the inner circumferential surface of the second coupling part.

15. The caliper brake according to claim 13, wherein a plurality of the elastic protrusions is formed in a moving direction of the guide rod.

16. The caliper brake according to claim 10, wherein a fastening groove to which the second coupling part is coupled is provided in the guide hole, and
a protrusion protruding toward the fastening groove to be seated on and coupled to the fastening groove is provided at a coupling end of the second coupling part coupled to the fastening groove.

17. The caliper brake according to claim 10, wherein the guide rod is provided with a locking groove provided such that the first coupling part is fitted and fixed thereto.

18. The caliper brake according to claim 10, wherein one end formed at an innermost part of the elastic protrusion of the second coupling part is a thickest part of the elastic protrusion of the second coupling part, and another end formed at an outmost part of the elastic protrusion of the second coupling part is a thinnest part of the elastic protrusion of the second coupling part.

19. The caliper brake according to claim 10, wherein the plurality of elastic protrusions of the second coupling part, each formed along a circumferential direction of the boot, are arranged one by one in an axial direction of the boot.

* * * * *